July 27, 1971     K. J. STALLER     3,595,949
METHOD OF MAKING PLASTIC FASTENER PROFILE
Filed Jan. 16, 1968     2 Sheets-Sheet 1
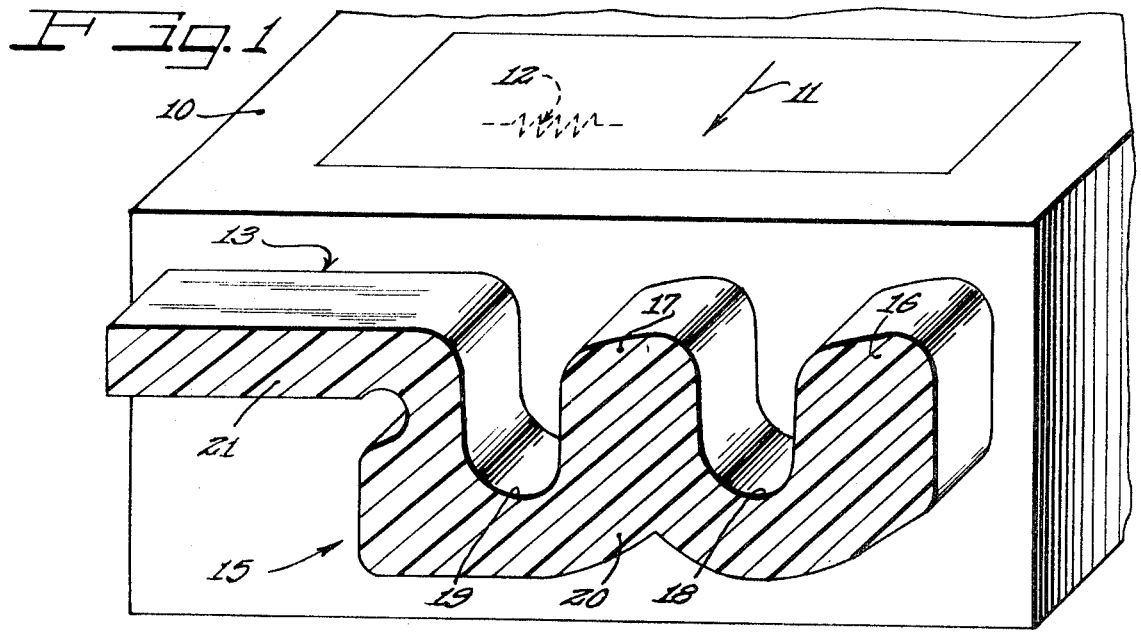
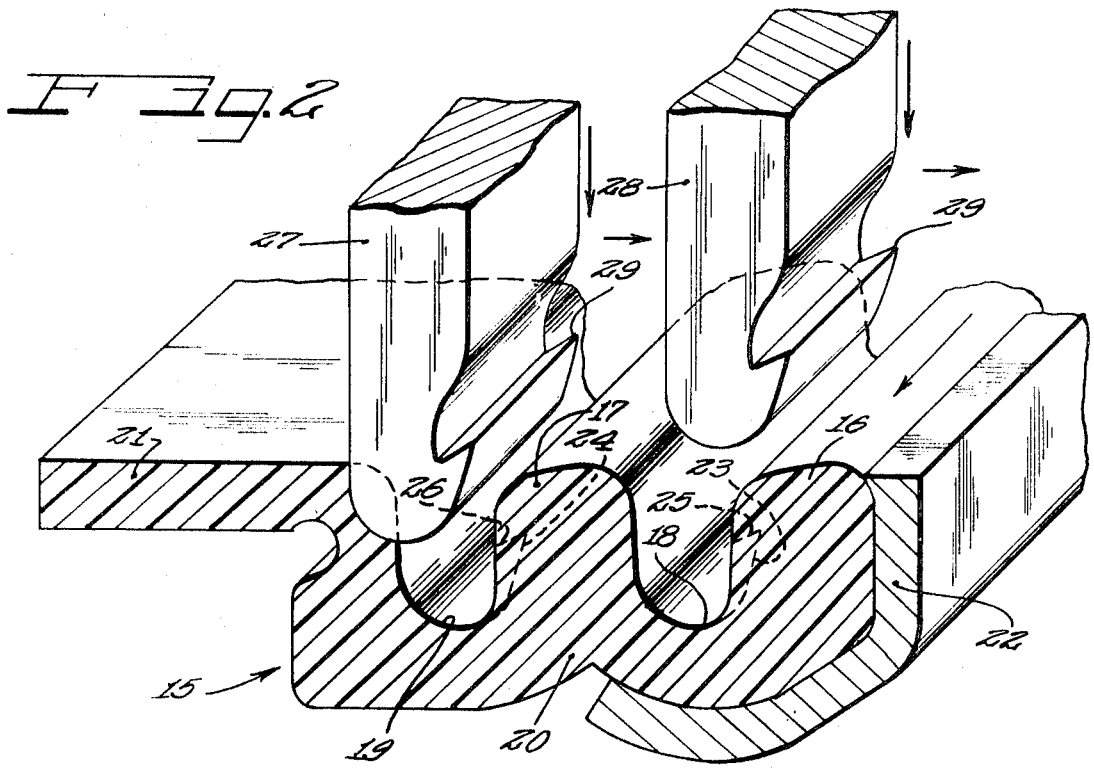
INVENTOR.
Karel J. Staller
BY *Hill, Sherman, Meroni, Gross & Simpson*
ATTORNEYS July 27, 1971 — K. J. STALLER — 3,595,949

METHOD OF MAKING PLASTIC FASTENER PROFILE

Filed Jan. 16, 1968 — 2 Sheets-Sheet 2

INVENTOR.
Karel J. Staller

BY
ATTORNEYS

United States Patent Office 3,595,949
Patented July 27, 1971

3,595,949
METHOD OF MAKING PLASTIC FASTENER PROFILE
Karel J. Staller, Rutherford, N.J., assignor to Flexigrip, Inc., Orangeburg, N.Y.
Filed Jan. 16, 1968, Ser. No. 698,245
Int. Cl. *B29c 17/10*
U.S. Cl. 264—146
6 Claims

ABSTRACT OF THE DISCLOSURE

A method for making an improved plastic fastener strip of a type with releasably interlocking rib and groove elements and particularly for extruding a streamlined rib element and undercutting grooves to form an overhanging tooth.

BACKGROUND OF THE INVENTION

The invention relates to an improved method and mechanism for continuously forming a plastic fastener strip, and to an improved strip structure.

Plastic fastener strips are conventionally made by extruding the strips through a die which is shaped to the exact shape of the fastener profile desired. The fastener profile for use will be attached to the edge of a sheet of plastic, such as to the top of a bag, to interlock with another or mating profile and for this purpose the profiles are shaped so that they automatically interlock when pressed together. For releasing the interlocking profiles, they are forced apart laterally such as by moving an opening slider with a separating wedge between the profiles.

Profiles of different shapes have been used and the type for which the method and mechanism of the present invention are particularly well designed for use is shown in the U.S. Madsen Pat. No. 2,637,085. This type of fastener has one or more rib elements with grooves beside the ribs and the coacting fastener strip will have similar ribs and grooves so that the ribs of one strip project into the grooves of the other strip. The sides of the ribs will have mating overhanging teeth which will interlock to prevent inadvertent separation of the fastener strips and to hold them together. For optimum fastening strength it is essential that the overhanging teeth be uniformly and accurately constructed both as to the depth of the tooth, the uniformity of its overhanging interlocking surface, and the angle of the interlocking surface.

Difficulties have been encountered in conventional extrusion methods in producing the tooth inasmuch as plastic tends to feed through a die opening at non-uniform speeds in different portions of the profile. This results in a profile of a shape different than the die opening. Also, difficulties are encountered in that non-uniform cooling and solidification of the plastic occurs with respect to different projecting areas of the tooth and profile also resulting in undesirable changes in the shape of the tooth. To counteract the undesirable effects of non-uniform formation due to extrusion it has been necessary to slow down the extrusion process. This reduces production and increases cost.

It is, of course, desirable to make the profiles as small as possible to effect a saving in plastic and reduce the weight. The closing elements of the fasteners are therefore delicate, with the teeth being only a few thousandths of an inch deep and the highest accuracy is essential. The accuracy of an extruding die is almost unlimited, being less than 0.001" but the irregularities in viscosity of flowing plastic which are effected by the slightest variation in temperature pressure and drawdown can greatly affect the accuracy of the extrusion, especially in the areas of constricted profiles.

An object of the present invention is to fulfill the requirements of speed and accuracy in the manufacture of plastic fastener profiles, eliminating the disadvantages of non-uniformity caused by a variation in flow viscosity caused by the irregular shapes of the profiles and eliminating the necessity of having to run at low speeds.

Another object of the invention is to provide a method for forming a profile fastener which achieves an improved fastener of improved accuracy and which has a greater intergripping power, due to the outline of its teeth being sharper and more defined and not rounded off by the flow of thermoplastic through the die.

A further object of the invention is to provide an improved fastener profile structure which is more reliable and remains better closed with twisting and bending, due to the improved gripping power of its teeth.

DESCRIPTION OF THE DRAWINGS

FIG. 1 is a schematic view of a mechanism performing the extrusion step of a streamlined profile;

FIG. 2 is a schematic view of a mechanism performing the cutting step of the process;

DESCRIPTION OF THE INVENTION

Figure 5:
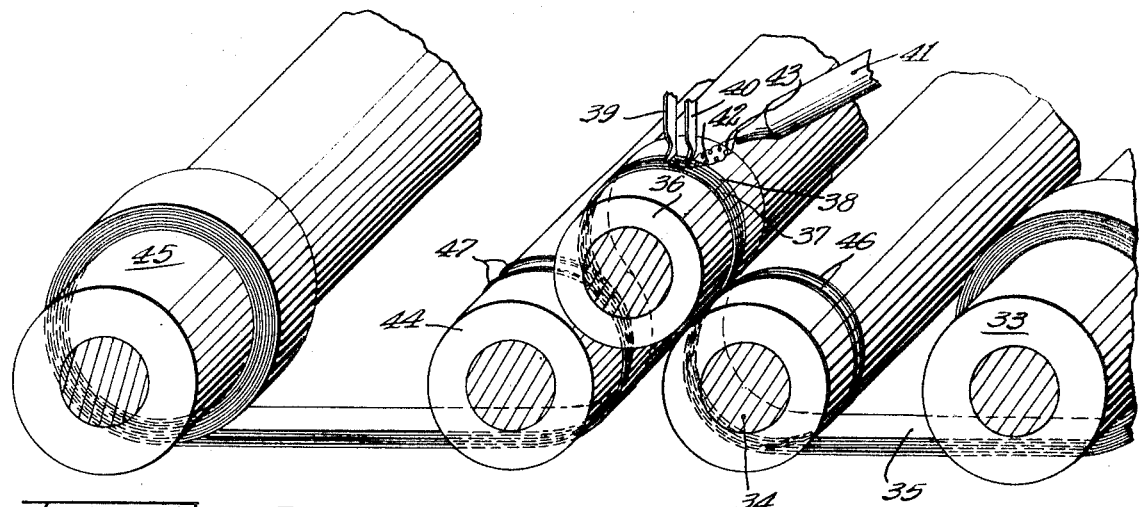
FIG. 5 is a perspective view shown in somewhat schematic form of an overall mechanism for performing the cutting step.

As shown in FIG. 1, in a first extruding step an exruding die head 10 is provided supplied with plastic by means of a plastic feed mechanism 11 which forces plastic material through the die head. A heater 12 keeps plasticized the thermoplastic materials, which may be polyethylene, vinyl or other similar material, and the plastic is extruded through the shaped die opening 13. The opening is carefully machined to the exact size to provide a fastener strip 15.

The fastener strip has a web portion 21 and a marginal portion 20, with the web portion adapted to be attached to a sheet for use of the strip. The marginal portion has projecting rib elements 16 and 17 with adjacent grooves 18 and 19. The rib elements are of the exact size and shape. The overhanging teeth, needed for the fastener to work, are not formed and will later be formed into the sides of the ribs 16 and 17. Thus, the fastener can have smooth uniform outer surfaces and there are no projecting areas or pockets or corners in the die which will tend to cause uneven flow of plastic and the strip 15 can be extruded at high speed and yet maintain accurate size and shape tolerances for the ribs 16 and 17.

In the next step of making the strip, when the plastic has cooled and solidified, teeth 25 and 26 are formed in the side of the ribs by cutting out portions at 23 and 24, as indicated by the dotted lines in FIG. 2. The cutting can be done at high speed, at least at as high a speed as that of the extrusion and can also be done in line with the extrusion, so that while a separate cutting operation is added, the entire manufacturing process can be completed in less time than with methods heretofore available.

The strip 15 is supported such as by a guide 22 to maintain it and the rib 16 in an accurate position as shown in FIG. 2 and is fed along at relative high speed in the direction indicated by the arrow. Cutters 27 and 28 are set down into the grooves 18 and 19 to cut the portions 23 and 24 from the ribs and form the teeth 25 and 26. The cutters are shaped with a leading cutting edge such as shown at 29 on each of the cutters. The cutters set down into the grooves and are accurately positioned and guided and a fixed predetermined accurate amount is cut from the side of the ribs. It will be understood that the cutters are shaped in accordance with the desired cutting angles and rib shape that is to be produced.

Figure 3:
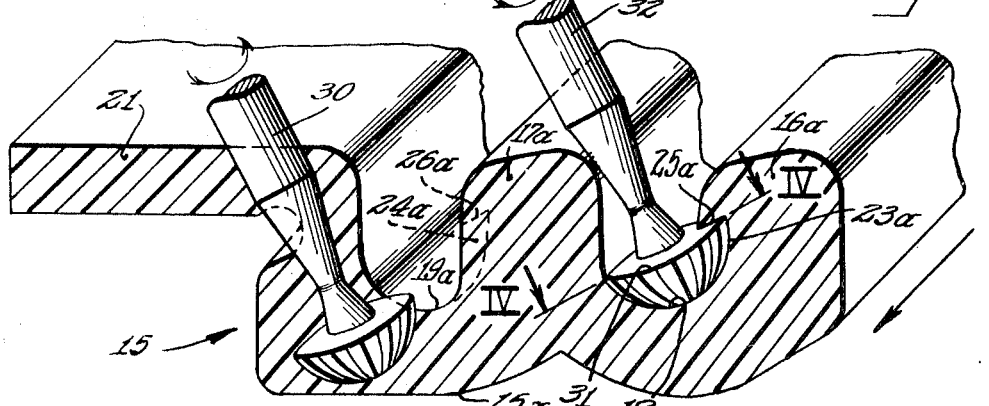
FIG. 3 is a schematic perspective view illustrating another method or cutting process.
Figure 4:
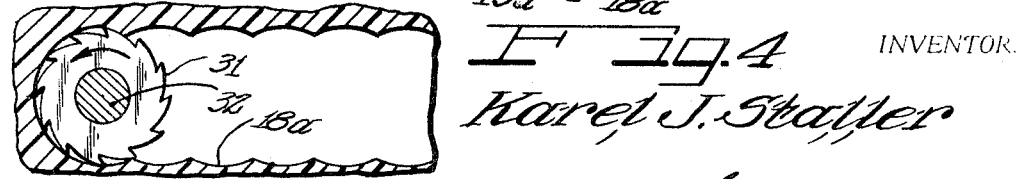
FIG. 4 is a sectional view taken substantially along line IV—IV of FIG. 3 illustrating the structure resulting from the step of FIG. 3.

FIG. 3 illustrates the process with another form of cutter being used. In the arrangement of FIG. 3, tiny rotary cutters 30 and 32 are used. The strip 15a is fed along in the direction indicated by the arrow and the cutter 32 is set down into the groove 18a and the cutter 30 set down into the groove 19a. The cutters form the undercut teeth 25a and 26a by removing the portions 23a and 24a from the sides of the ribs 16a and 17a.

Figure 6:
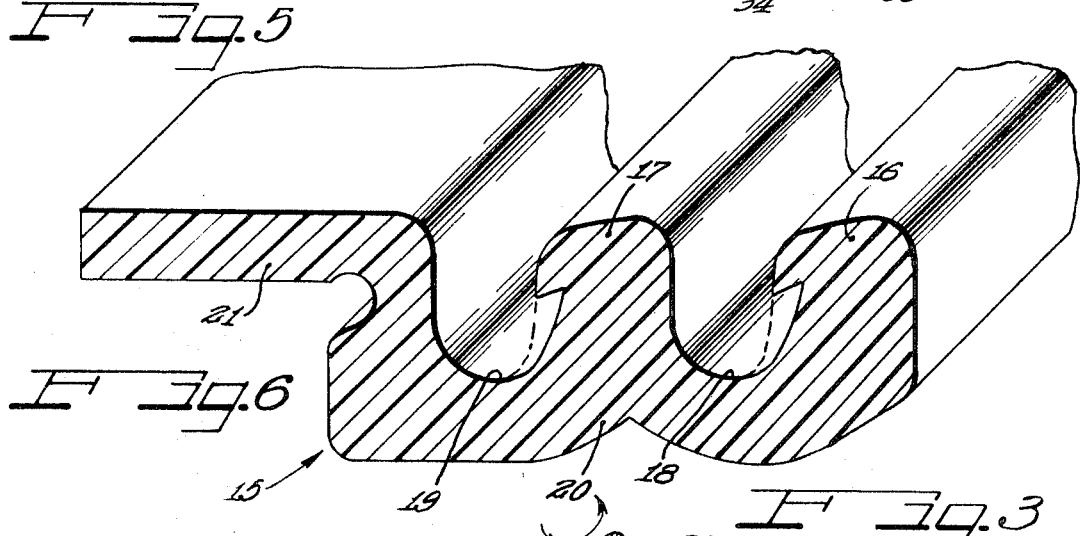
FIG. 6 is an enlarged sectional view of a portion of the fastener showing details of a completed portion of a profile.

The cutters each are fluted with radial cutting edges 31 and are rotated in the direction shown by the arrowed lines at the tops of the cutters in FIG. 3. The strip is moved at a high speed relative to the cutter heads and this in combination with the cutter shape forms an uneven or wavy undulating surface 18a or 19a beneath the overhanging tooth 25a or 26a. The frequency and depth of the undulation 18a, or course, can be controlled by selection of the cutter and its speed. Cutting teeth which are more widely spaced will, of course, cause deeper undulations and the speed of rotation of the cutter head can be increased or decreased, as can the speed of movement of the strip 15a. Each of these factors will be fully appreciated by those versed in the art of manufacturing and cutting plastics and need not be described in detail. A high speed cutter is preferred and a rotation of around 20,000 r.p.m. is a preferred speed. A typical profile of a fastener strip as shown in FIG. 6 may have a rib with a thickness of .050", with a height of .060" and the overhanging tooth having a depth of .014". The height of the rib (and of the groove) will be .060". The angle of the overhanging hook will be approximately 30° relative to the plane of the strip. While a fastener strip is shown with two ribs it will be appreciated that different fastener strip designs with different numbers of ribs may be used.

The mechanism for driving the rotating cutters of FIG. 3, and for relatively moving the webs 15 and 15a of FIGS. 2 and 3, are not shown in detail but conventional operating mechanisms may be used as will be fully understood by those versed in the art.

As an example of a preferred type of mechanism, FIG. 5 shows a strip 35 wound on a feed roll 33, though this strip could be coming continuously and directly out of an extruder, thereafter being cooled, with the strip 35 being fed to a successive guide roll 34. The strip passes upwardly over a backing roll 36 into the path of cutters 39 and 40, which cut the overhanging teeth in the ribs 37 and 38. The plastic portions 42 and 43 cut out of the ribs are removed such as by a suction head 41. The strip then is fed downwardly over a guide roll 44 and wound onto a take-up roll 45, with each of the rolls being driven at uniform peripheral speed by a suitable drive mechanism, not shown. Rolls 34 and 44 are grooved at 46 and 47 to position the strip 35.

Thus, it will be seen that I have provided a method and mechanism which meet the objectives and advantages hereinabove set forth. A high speed operation results which decreases production costs and yet which produces an improved, more accurate product. Further, with the use of a rotary cutter as illustrated in FIG. 3, a new structure is provided having a wavy surface under the overhanging hook. While only one profile is shown, it, of course, will be understood that a second fastener strip will be used with the fastener strip of FIG. 3, also having an undulating or non-uniform hook surface so that the two surfaces will interlockingly coact resisting their being unlocked with twisting and rotating.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. The method of forming an interlocking profile rib and groove type releasable pressure interlocking plastic fastener strip wherein the profiles have very small dimensions and the strip is formed at a speed wherein the dimensional tolerance cannot be maintained in the extrusion die, the steps consisting essentially of:
   continuously extruding heated plastic through a die shaped to accurately form a projecting rib on the strip with a groove at the side of the rib,
   continuously cooling the plastic to a temperature wherein it obtains substantial rigidity,
   passing a cutting tool continuously relatively parallel to the strip positioned to project into the side of the rib uniformly continuously along the length thereof cutting a continuous tooth with an overhanging downwardly facing surface and maintaining the position of the cutting tool constant relative to the groove so that when another interlocking rib is pressed into the groove it will engage the accurately located tooth in the side of the rib.

2. A method of making a continuous plastic fastener strip according to claim 1, comprising by removing plastic from said side of the rib with the cutting tool forming a wavy undulating surface to attain an improved locking surface thereon.

3. A method of making a continuous plastic fastener strip according to claim 1, wherein a plurality of accurately sized ribs are extruded being parallel and spaced from each other and each having a groove along one side, and inserting respective cutting tools into each of said grooves and cutting a separate overhanging tooth in each of said sides of the ribs.

4. A method according to claim 1 including removing material cut out of the rib by the cutting tool by a suction head.

5. A method according to claim 1 wherein the cutting tool is in the form of a rotary knife with a plurality of radial cutting edges into said groove and the tool is moved at a speed so that the cutting edges form a wavy undulating surface.

6. The method of forming an interlocking profile of a rib and groove type releasable interlocking plastic fastener strip wherein the strip has profiles with very small dimensions and is formed at a speed wherein the dimensional tolerance cannot be maintained in the extrusion die, the steps consisting essentially of:
   continuously extruding heated plastic through a die shaped to accurately form a plurality of parallel round projecting ribs on the surface of the strip with parallel grooves at the sides of the ribs,
   continuously cooling the plastic to a temperature wherein it is substantially rigid,
   passing a plurality of cutting tools continuously relatively parallel to the strip projecting into the grooves with said tools spaced apart a distance accurately equal to the spacing between the grooves and locating said tools accurately relative to the position of the grooves and projecting said tools against the sides of the ribs continuously forming an undercut into the side walls of the ribs with an overhanging tooth above the undercut to form interlocking overhanging surfaces with said surfaces accurately located relative to the grooves so that mating interlocking ribs when interengaged into the grooves will lockingly engage with accurately formed interlocking surfaces.

References Cited

UNITED STATES PATENTS

| | | | |
|---|---|---|---|
| 2,925,037 | 9/1960 | Ruck | 264—145 |
| 3,086,246 | 4/1963 | Stone | 264—145X |
| 3,268,637 | 8/1966 | Cremer | 264—145X |
| 3,329,998 | 7/1967 | Stöhr | 264—145X |
| 3,387,069 | 6/1968 | Stöhr | 264—145 |
| 3,445,915 | 5/1969 | Cuckson | 264—146X |
| 3,454,693 | 7/1969 | Crenshaw | 264—151 |
| 3,454,694 | 7/1969 | Delaire | 264—151 |
| 1,369,522 | 2/1921 | Dochnal | 264—145 |
| 1,612,724 | 12/1926 | Housekeeper | 264—145X |
| 1,940,106 | 12/1933 | Snyder | 83—5X |
| 3,144,216 | 8/1964 | Billingsley | 83—100X |
| 3,156,149 | 11/1964 | Frizelle | 83—100X |
| 3,316,811 | 5/1967 | Friedman et al. | 83—5X |
| 3,465,625 | 9/1969 | Daly | 83—100 |
| 3,038,205 | 6/1962 | Plummer | 24—201C(UX) |
| 3,340,116 | 9/1967 | Naito | 24—201CX |
| 3,380,481 | 4/1968 | Krans | 24—201C(UX) |

FOREIGN PATENTS

| | | | |
|---|---|---|---|
| 226,430 | 3/1963 | Austria | 264—145 |
| 1,067,514 | 5/1967 | Great Britain. | |

ROBERT F. WHITE, Primary Examiner

A. M. SOKAL, Assistant Examiner

U.S. Cl. X.R.

24—201C